United States Patent [19]

Fister, Jr. et al.

[11] 4,214,041
[45] Jul. 22, 1980

[54] COMPOSITE ALUMINUM CAPACITOR FOIL

[75] Inventors: Julius C. Fister, Jr., Hamden, Conn.; William C. Setzer, Creve Coeur, Mo.; Leon Cox, Pinson, Tenn.

[73] Assignee: Swiss Aluminium Ltd., Chippis, Switzerland

[21] Appl. No.: 965,592

[22] Filed: Dec. 1, 1978

[51] Int. Cl.$^2$ .................. B21C 37/00; C25D 7/04
[52] U.S. Cl. ........................................ 428/607; 428/654
[58] Field of Search ..................... 428/607, 654

[56] References Cited

U.S. PATENT DOCUMENTS

| | | | |
|---|---|---|---|
| 1,709,801 | 4/1929 | Müller | 428/607 |
| 2,151,302 | 3/1939 | Scheller | 428/607 |
| 3,168,381 | 2/1965 | Finnegan et al. | 428/654 |
| 3,345,145 | 10/1967 | Pijls | 428/607 |
| 3,492,545 | 1/1970 | Meyerhoff | 428/607 |
| 3,717,915 | 2/1973 | Teubler et al. | 428/654 |

*Primary Examiner*—Brooks H. Hunt
*Attorney, Agent, or Firm*—Bachman and LaPointe

[57] ABSTRACT

A composite aluminum base alloy foil is described which is particularly useful as foil material in electrical capacitors. The composite is based on the use of a relatively lower purity, inexpensive core material clad on both sides with a relatively higher purity, more expensive cladding material.

11 Claims, No Drawings

COMPOSITE ALUMINUM CAPACITOR FOIL

BACKGROUND OF THE INVENTION

Electrical capacitor manufacturers frequently utilize aluminum foil in the production of their capacitors to reduce both the weight and overall size of the capacitors. The aluminum foil provides a large surface area in a relatively small amount of space within the capacitor container. This surface area of the aluminum foil is usually enhanced through the use of chemical or electrochemical etching of the foil to develop what are known as submicron-diameter tunnel networks. The increased surface area provided by such etching, in combination with the electrical insulation provided by a subsequently formed anodic film on the surface of the foil, is responsible for high capacitance levels attained by the foil per unit area of foil.

Generally speaking, only the relatively expensive high purity aluminum is utilized as the foil material in capacitors. The etching response of such foil depends upon the conditions set forth by the capacitor manufacturer and is determined by both the foil composition and the processing utilized to make the foil. For low voltage applications (below 100 volts) where a leakage current from the capacitor is not as crucial as high voltage applications, the lower purity and less expensive aluminum grades such as AA 1188 or 1193 are generally employed. The cold rolled -H19 temper is preferred over the -0 temper condition for foil utilized in this particular voltage range. This preference is due to the finer scale tunnel networks which develop on the surface of the foil with cold worked tempers. A full advantage of the etched tunnel networks can be realized in the low voltage applications since the anodic films employed in the capacitor foil manufacture generally do not completely seal the tunnel networks.

Capacitor manufacturing is a very highly cost competitive industry and metal suppliers who can provide aluminum foil which is capable of attaining high capacitance for the least amount of metal cost utilized in the foil have a greater sales advantage over competitors. One method for providing such increased capacitance in fairly low purity aluminum foils is the addition of certain elements which act to enhance the capacitance of the alloys to which they are added. For example, U.S. Pat. No. 3,498,765 describes a 78% improvement in capacitance levels over high purity aluminum utilizing a 70 ppm (parts per million) cadmium addition to the aluminum. This patent further discusses a 10% improvement in capacitance over high purity aluminum through the addition of 60 ppm indium to the base aluminum. U.S. Pat. No. 3,578,570 describes enhanced etch pore density and, therefore, increased capacitance in annealed aluminum foil which contains one or more of the elements antimony, barium or zinc in quantities of 5 to 200 ppm and at most 0.5 ppm of lead and bismuth plus at most 2 ppm of calcium and chromium. However, intentional alloying additions tend to increase the cost of the final product.

It is therefore an object of the present invention to provide an improved aluminum foil which exhibits good capacitance levels in cold worked tempers.

It is a further object of the present invention to provide a foil as above which attains this good capacitance at a low cost and without the necessity for the utilization of specific elemental additions to the aluminum.

It is a further object of the present invention to provide a foil as aforesaid which is based on a composite aluminum base alloy system.

Further objects and advantages of the present invention will become more apparent from a consideration of the following specification.

SUMMARY OF THE INVENTION

In accordance with the present invention, it has now been found that the foregoing objects and advantages may be readily obtained. The present invention resides in a composite aluminum foil having a thickness of from 0.0001 to 0.01 inch which is particularly useful as foil material in electrical capacitors. The foil of the present invention has a relatively lower purity core of an aluminum base alloy having not less than about 0.03% each of iron and silicon, clad on both sides with a relatively higher purity aluminum base alloy having not more than about 0.02% each of iron and silicon, wherein said cladding constitutes not more than 20% of the thickness of said composite on each side, and preferably not more than 10% of the thickness of said composite on each side.

As indicated hereinabove, the surface area of the aluminum foil is usually enhanced through the use of chemical or electrochemical etching. In accordance with the present invention, one may have the etching not enter the core in those instances where etching into the core will downgrade capacitance.

DETAILED DESCRIPTION

A crucial step in the manufacture of electrolytic capacitors is etching of the aluminum foil to develop increased surface area after which the etched anode foils are anodized or, in other words, treated so as to form an oxide film which acts as an electrical insulator. In higher voltage capacitor applications, it is considered important to use higher purity metal in order to prevent current leakage from the capacitor. In accordance with the present invention, a composite foil material is provided which utilizes a cladding material with a higher purity so as to minimize the leakage current at higher applications. A lower purity core material is used which acts as an etch stop thereby "holding the foil together" with extended etching time.

An important consideration is that the composite of the present invention will allow a significant cost reduction with regards to the quantity of high purity metal required to produce a product with capacitance and leakage characteristics equivalent to higher purity grades.

For example, in accordance with the present invention, one may clad a lower purity core with high purity foil stock. It is thereby possible to produce a relatively inexpensive composite foil product which has the capacitance gain and leakage characteristics of the more expensive cladding material.

In addition, it is within the scope of the present invention to clad with a high purity material which contains controlled element additions which are designed to increase the number of etched sites, thereby increasing the total capacitance gain. It is envisioned that this cladding layer may be relatively thin, i.e., from 1 to 5% of the thickness of the composite on each side, so that it is completely removed during the etching process, however, still being instrumental in the number of sites which are nucleated on the underlying core material. For example, an alloying addition of from 0.001 to 0.05% indium (as 100 ppm indium) to high purity aluminum produces a material which etches with a large number of small pits. An alloying addition of from 0.001 to 0.05% tin (as 100 ppm tin) produces large, deep pits. Therefore, by a thin cladding of such an indium-containing aluminum alloy with a core of such a tin-containing aluminum alloy in accordance with the present invention, nucleation of pits would be promoting in the core by tunneling in the cladding which would result in a composite material with a high density of deep tunnels.

The present invention also envisions the use of a lower purity core which contains controlled additions so as to increase or decrease its activity relative to the cladding in the etching bath. For example, 0.001 to 0.5% of either manganese and/or copper make alloys more cathodic than pure aluminum, and gallium (0.001–0.5%), mercury (0.002–0.01%), indium and/or tin (0.001–0.05% each) make alloys more anodic than aluminum. Therefore, it would be desirable to combine an alloy cladding with an addition selected from the group consisting of gallium, mercury, tin and indium or mixtures thereof in the foregoing amounts with a core containing an addition selected from the group consisting of manganese and copper and mixtures thereof in the foregoing amounts. Conversely, the gallium, mercury, tin and/or indium additions can be made to the core and the manganese and/or copper additions made to the cladding. This would be particularly helpful for 'O' temper and high voltage foil as it will cause the deeper tunnels to increase in diameter so that they are not sealed off. Thus, they thereby contribute capacitance gain at higher voltage anodizing conditions and higher voltage applications. Thus, it may be possible to make the core either anodic or cathodic to the liner material, whichever is found to be most desirable, by controlled additions.

As indicated hereinabove, the core is a relatively lower purity aluminum base alloy having not less than about 0.03% each of iron and silicon, and preferably not more than 1.0% total silicon plus iron. Typical core materials contemplated by the present invention include Aluminum Alloy 1100 (containing up to 1.0% silicon plus iron, but not less than 0.03% each, 0.05 to 0.20% copper, up to 0.05% manganese and up to 0.10% zinc), lower purity Aluminum Alloy 1193 (containing from 0.03 to 0.04% silicon and from 0.03 to 0.04% iron) and lower purity Aluminum Alloy 1188 (containing from 0.03 to 0.06% silicon and from 0.03 to 0.06% iron).

The cladding is a higher purity material containing from 0.001 to 0.02% each iron and silicon. In addition, the cladding may contain one or more of the following additivies: from 0.001 to 0.015% gallium, up to 0.05% each of manganese and magnesium, up to 0.01% each of chromium, nickel and zinc, from 0.005 to 0.03% titanium, from 0.001 to 0.006% boron. Typical cladding materials include a high purity aluminum base alloy containing from 0.001 to 0.015% gallium such as is disclosed in copending U.S. Patent Application Ser. No. 847,781, a high purity aluminum base alloy containing from 0.005 to 0.05% titanium and optionally also from 0.001 to 0.006% boron such as is disclosed in copending U.S. Patent Application Ser. No. 847,782, high purity Aluminum Alloy 1193 (containing 0.001–0.02% each iron and silicon), high purity Alloy 1196 (containing 0.001–0.008% each iron and silicon), and Aluminum Alloy 1199 (containing 0.001 to 0.006% each iron and silicon).

Representative preferred composites within the scope of the present invention include (1) high purity Aluminum Alloy 1196 clad on Aluminum Alloy 1100, (2) high purity Aluminum Alloys 1193 or 1196 clad on low purity Aluminum Alloy 1193.

Any suitable method may be chosen for preparing the composite of the present invention, such as preparing a composite sheet or plate and rolling same to desired gage. Preferably, the individual components of the composite are prepared and hot rolled to hot rolled gage or to intermediate cold rolled gage. The components at hot rolled gage or at the intermediate cold rolled gage are then cold rolled together to foil, preferably with a minimum total cold reduction of 80%, to final gage to form the composite of the present invention.

The individual ingots used in the present invention may be cast by any convenient method. Care should be taken, however, with the higher purity cladding material to insure that no undesired elements enter the system as impurities. Care should also be taken with said cladding that the alloy be kept clean throughout the casting procedure.

The cast ingots should be carefully cleaned (scalped) to remove any visible impurities, especially the cladding. The scalped ingots may then be homogenized at a temperature ranging from 850° to 1175° F. for at least ½ hour. It is preferred that the ingots be homogenized at 1100° F. (±10° F.) for approximately 10 hours. The ingots may then be hot worked at 450° to 1100° F., followed by a 50° F. per hour minimum rate water quenching before cold working. It is preferred that the ingots be hot worked between 950° and 1100° F. The quenching rate noted above is a minimum rate. It is preferred that the alloys receive an immediate quench or at least a 1000° F. per hour quenching.

The alloys are then rolled together in a cold working operation to form the composite of the present invention, with a minimum reduction of 80% required. It is preferred that the alloys be cold worked together to a minimum of 99% reduction. The final gage of the alloys attained from the cold working should be between 0.0001 and 0.01". The preferred final gage should range between 0.001 and 0.01".

The temper of the composite foil depends upon the voltage in the capacitor in which the foil is placed. Low voltage capacitors generally require hard temper foil while high voltage capacitors generally require foil which has been softened by annealing. The foil produced from the composite of the present invention may be formed into various tempers depending upon the final use.

Further objects and advantages of the present invention will become more apparent from a consideration of the following illustrative example.

EXAMPLE

Aluminum Alloy 1100 (1.0% maximum silicon plus iron, but greater than 0.03%, 0.05 to 0.2% copper, up to 0.05% manganese, up to 0.1% zinc, balance aluminum) and low purity Aluminum Alloy 1193 (from 0.03 to 0.04% each silicon and iron, 0.006% maximum copper, 0.01% maximum each manganese and magnesium, 0.03% maximum zinc, 0.01% maximum titanium, balance aluminum) of low capacitance were used as core materials. High purity Aluminum Alloys 1199 (containing 0.001 to 0.006% each iron and silicon) and 1193 (containing 0.001 to 0.02% each iron and silicon) of high capacitance were used as the cladding components. These materials were prepared as composites as shown in the descriptions set forth in Tables I and II. The composites were then processed to 0.0035 inch thickness to provide hard temper (-H19) materials for capacitance tests as shown in Tables I and II. A piece each of the component materials was processed directly to foil for use as controls.

The resulting capacitance values, Table III, show that in the -H19 temper the Alloy 1199 clad on Alloy 1193 provides a capacitance equal to that of the low capacitance core component. However, results with Alloy 1193 clad on Alloy 1100 produced a capacitance equal to that normally observed with the high capacitance clad component. The capacitance of Alloy 1199 clad on Alloy 1100 was 7 $\mu f/in^2$ higher than that of the bare 1199 Alloy clad. The results are all the more striking because of the disintegration observed when the bare Alloy 1100 was etched. The Alloy 1199 clad on Alloy 1100 and Alloy 1193 clad on Alloy 1100 effectively prevent the degradation of the core alloy such that capacitance values typically found with the solid alloy are observed. Capacitance measurements were performed using conventional measurement techniques, such as described in the copending United States patent applications set forth hereinabove.

TABLE I
COMPOSITE FOIL COMPONENTS

Composite I
Core: 0.25" × 4" × 5"
Alloy 1100 annealed
Clad: 0.020" × 4" × 12"
cold rolled Alloy 1199

Composite II
Core: 0.25" × 4" × 5"
Alloy 1100 annealed
Clad: 0.020" × 4" × 12"
cold rolled Alloy 1193 ("High Capacitance")

Composite III
Core: 0.25" × 4" × 5"
Alloy 1193 ("Low Capacitance")
Clad: 0.020" × 4" × 12"
cold rolled Alloy 1199

Composite IV
Core: 0.25" × 4" × 5"
Alloy 1193 ("Low Capacitance")
Clad: 0.020" × 4" × 12"
cold rolled Alloy 1193 ("High Capacitance")

TABLE II
COMPOSITE FOIL PROCESSING (1) Components
(2) Degrease
(3) Clean
(4) Rinse and Dry
(5) Wire Brush Both Components
(6) Bond With 50% Single Pass Reduction at Room Temperature
(7) Cold Roll The Composite to 0.0035" Gage

TABLE III
COMPOSITE FOIL RESULTS

| Composite No. | Clad | Core | -H19 Temper ($\mu f/in^2$) |
|---|---|---|---|
| I | 1199 | 1100 | 106 |
| II | 1193 | 1100 | 114 |
| III | 1199 | 1193 | 71 |
| IV | 1193 | 1193 | 69 |
| Bare Components | | | |
| 1100 core | | | Disintegrated on Etching |
| 1193 core | | | 71 |
| 1199 clad | | | 99 |
| 1193 clad | | | 115 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composite aluminum capacitor foil having a thickness from 0.0001 to 0.01 inch and having a relatively lower purity core of an aluminum base alloy having not less than about 0.03% each iron and silicon clad on both sides with a relatively higher purity aluminum base alloy having not more than about 0.02% each iron and silicon, wherein said cladding constitutes not more than 20% of the thickness of said composite on each side, wherein said composite is characterized by low cost and good capacitance and leakage characteristics.

2. A composite foil according to claim 1 wherein said cladding constitutes not more than 10% of the thickness of said composite on each side.

3. A composite according to claim 2 wherein said cladding constitutes from 1 to 5% of the thickness of said composite on each side.

4. A composite foil according to claim 1 wherein said foil is etched and wherein the etching does not enter the core.

5. A composite foil according to claim 1 wherein said foil is etched and wherein the etching enters the core.

6. A composite according to claim 1 wherein the cladding contains from 0.001 to 0.05% indium and the core contains from 0.001 to 0.05% tin.

7. A composite according to claim 1 wherein a material selected from the group consisting of gallium from 0.001 to 0.5%, mercury from 0.002 to 0.01%, indium from 0.001 to 0.05%, tin from 0.001 to 0.05%, and mixtures thereof is present in one of said core and cladding, and a material selected from the group consisting of manganese from 0.001 to 0.5%, copper from 0.001 to 0.5%, and mixtures thereof is present in the other of said core and cladding.

8. A composite according to claim 1 wherein said cladding is high purity Aluminum Alloy 1196 and said core is Aluminum Alloy 1100.

9. A composite according to claim 1 wherein the components are rolled together with a minimum reduction of 80%.

10. A composite according to claim 1 wherein said core contains a total of not more than 1.0% iron plus silicon and wherein said cladding contains from 0.001 to 0.02% each iron and silicon.

11. An aluminum capacitor foil according to claim 1 wherein said foil is etched and has an oxide film thereon which acts as an electrical insulator.

* * * * *